(12) United States Patent
Fuchs et al.

(10) Patent No.: US 9,046,335 B2
(45) Date of Patent: Jun. 2, 2015

(54) METHOD FOR MEASURING THE COORDINATES OF WORKPIECES ON A COORDINATE-MEASURING APPARATUS

(71) Applicant: Carl Zeiss Industrielle Messtechnik GmbH, Oberkochen (DE)

(72) Inventors: Anton Fuchs, Boehmenkirch (DE); Rudolf Kern, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 365 days.

(21) Appl. No.: 13/658,714

(22) Filed: Oct. 23, 2012

(65) Prior Publication Data

US 2013/0111773 A1  May 9, 2013

Related U.S. Application Data

(63) Continuation of application No. PCT/EP2011/055905, filed on Apr. 14, 2011.

(30) Foreign Application Priority Data

Apr. 23, 2010  (DE) .......................... 10 2010 018 250

(51) Int. Cl.
- G01B 5/004 (2006.01)
- G01B 5/008 (2006.01)
- G01B 21/04 (2006.01)

(52) U.S. Cl.
CPC .............. *G01B 5/008* (2013.01); *G01B 21/045* (2013.01); *G01B 21/047* (2013.01)

(58) Field of Classification Search
CPC ..... G01B 5/008; G01B 21/045; G01B 21/047

USPC .................................................. 33/503, 556
See application file for complete search history.

(56) References Cited

U.S. PATENT DOCUMENTS

| | | | |
|---|---|---|---|
| 4,333,238 A | 6/1982 | McMurtry | |
| 5,425,180 A | 6/1995 | Breyer | |
| 5,526,576 A | 6/1996 | Fuchs et al. | |
| 5,579,246 A | 11/1996 | Ebersbach et al. | |

(Continued)

OTHER PUBLICATIONS

International Search Report dated Jul. 20, 2011 of international application PCT/EP2011/055905 on which this application is based.

(Continued)

*Primary Examiner* — G. Bradley Bennet
(74) *Attorney, Agent, or Firm* — Walter Ottesen

(57) ABSTRACT

A method for measuring the coordinates of workplaces on a coordinate-measuring device has a probe head including a probe and a probe sensor associated therewith. The method includes generating a probe signal when the probe contacts a workpiece. From this signal, dimensional values are determined that represent the position of the probe head when the workpiece is contacted. The probe head additionally includes an acceleration sensor generating an acceleration signal when the probe head accelerates, wherein the probe signal and the acceleration signal are fed to a control and analysis unit for analysis. This unit determines the dimensional values so that an analysis signal is determined by subtracting the probe signal and the acceleration signal from each other, and the dimensional values representing the position of the probe head when contacting the workpiece are determined only using the analysis signal.

24 Claims, 8 Drawing Sheets

(56) References Cited

U.S. PATENT DOCUMENTS

| | | | |
|---|---|---|---|
| 5,862,604 A | 1/1999 | Fuchs et al. | |
| 6,044,569 A * | 4/2000 | Ogihara et al. | 33/503 |
| 6,708,420 B1 | 3/2004 | Flanagan | |
| 7,599,813 B2 * | 10/2009 | Grupp | 33/503 |
| 7,752,766 B2 | 7/2010 | Ruck et al. | |
| 8,332,173 B2 * | 12/2012 | Ishikawa | 702/95 |
| 8,676,533 B2 * | 3/2014 | Wooldridge et al. | 702/141 |
| 8,782,915 B2 * | 7/2014 | Reitemeyer et al. | 33/556 |
| 2005/0022409 A1 | 2/2005 | Yamamoto et al. | |
| 2011/0004437 A1 | 1/2011 | Wooldridge et al. | |

OTHER PUBLICATIONS

English translation of the Office action of the German Patent Office dated Dec. 20, 2010 in German patent application 10 2010 018 250.8 on which the claim of priority is based.

English translation of International Preliminary Report on Patentability and Written Opinion of the international searching authority dated Oct. 23, 2012 in international patent application PCT/EP2011/055905 on which the claim of priority is based.

* cited by examiner

METHOD FOR MEASURING THE COORDINATES OF WORKPIECES ON A COORDINATE-MEASURING APPARATUS

CROSS REFERENCE TO RELATED APPLICATIONS

This application is a continuation application of international patent application PCT/EP2011/055905, filed Apr. 14, 2011, designating the United States and claiming priority from German application 10 2010 018 250.8, filed Apr. 23, 2010, and the entire content of both applications is incorporated herein by reference.

FIELD OF THE INVENTION

The invention relates to a method for treasuring the coordinates of work pieces on a coordinate measuring device having a probe head, which includes a probe unit and a probe sensor which is assigned to the probe unit and, given contact of a work piece with the probe unit, generates a probe signal with the aid of which there are determined scale values that represent the position of the probe head when making contact with the work piece, in which the probe head additionally includes an acceleration sensor that generates an acceleration signal upon accelerations of the probe head, the probe signal and the acceleration signal being fed to a control and evaluation unit for evaluation. The invention further relates to a corresponding coordinate measuring device for measuring work pieces.

BACKGROUND OF THE INVENTION

Such a method is already known from United States patent application publication 2011/0004437 and is used in order to avoid so-called erroneous contacts. Before the particular solution of United States patent application publication 2011/0004437 is examined, the background to such erroneous contacts is firstly described. Thus, in the past such coordinate measuring devices usually had only one probe sensor in the form, for example, of a piezoelectric sensor or a strain gauge whose probe signal was evaluated in order to determine the contact time point, and thus to determine the associated scale values. Here, it is possible during measurement operation that the probe unit is so strongly accelerated by accelerations of the probe head when contact has been made with a work piece that the probe sensor thereby generates a probe signal on the basis of which a contact is assumed. Accelerations of the probe head by which such erroneous contacts can be initiated can, for example, be caused by vibrations of the coordinate measuring device, by accelerations of the linear axis drives of the coordinate measuring device, by accelerations of the rotary axis drives of a rotary swivel joint, by structureborne sound or by airborne sound. Even poor linear axis drives of the coordinate measuring device, which cause rough running, can already lead to such erroneous contacts.

In order to suppress such erroneous contacts, there have already been provided in the past different trigger conditions that generally must be cumulatively satisfied so that valid contact occurs. Aside from the overshooting of a trigger threshold by the probe signal, by way of example a supplementary trigger condition has been added in the form of a check as to whether the probe signal overshoots the trigger threshold for a predetermined duration. However, this can likewise lead to erroneous contacts in the case of comparatively long-lasting accelerations.

Our U.S. Pat. No. 5,862,604, U.S. Pat. No. 5,526,576 and U.S. Pat. No. 5,425,180 show evaluation circuits in the case of which it is not only the probe signal that is used to trigger a contact in order to initiate a contact. Rather, the probe unit is additionally also further deflectably supported on the probe head, a switch element being provided that outputs a switching signal upon a deflection. What is required here as trigger conditions for a valid contact is that the probe signal exceeds a trigger threshold, that the switching signal is output and that the overshooting of the trigger threshold and the outputting of the switching signal be performed within a predetermined time period. Despite these trigger conditions, erroneous contacts can also occur here given accelerations of the probe head. This is the case when because of accelerations of the probe head the probe signal overshoots the trigger threshold and a contact does take place shortly thereafter and the switching signal is also thereby output. Since the scale values are read out on the basis of the probe signal, the contact time point determined herefrom then lies partly clearly ahead of the actual contact time point, and this leads to defective measured values.

In order to avoid such erroneous contacts caused by acceleration, United States patent application publication 2011/0004437 proposes a method in which, aside from the probe sensor that outputs an appropriate probe signal given contact of a work piece with the probe unit, there is provided in the probe head an acceleration sensor that supplies an acceleration signal upon accelerations of the probe head. In order to avoid erroneous contacts, for the case when the acceleration sensor supplies an acceleration signal, a change is made to the trigger conditions on the basis of which the scale values which represent the position of the probe head are adhered to. In particular, the level of a predefined threshold value that, must be overshot by the probe signal is raised, and the duration in the course of which the threshold value thereof must be overshot by the probe signal is extended by a predefined time. As a result of the increase of the threshold value to be overshot, and of the extension of the predefined time in the course of which the threshold value must be overshot before acceptance of the scale values is initiated, the probe head is "desensitized", and the contact time point defined by the trigger is therefore ever further removed from the actual contact time point. Further, because of this the conditions under which a contact is detected change continuously as a function of the acceleration. The contacting thereby becomes imprecise.

SUMMARY OF THE INVENTION

It is therefore an object of the present invention to provide a method for coordinate measurement of the type mentioned at the beginning in which erroneous contacts are prevented without changing the conditions under which a contact is detected, and to propose a corresponding coordinate measuring device on which an appropriate method is implemented.

The particular feature of the inventive solution is to be seen here in that the control and evaluation unit determines said scale values in that an evaluation signal is determined by subtracting the probe signal and the acceleration signal from one another, whereupon this evaluation signal is used to determine the scale values that represent the position of the probe head when making contact with the work piece. This renders it possible to eliminate from the probe signal, at least to a large extent, those components that are caused by accelerations. Inasmuch as the probe signal of the probe sensor has been caused not by an actual contact but rather by accelerations of the probe head, the result of the subtraction is a signal of very small amplitude.

The subtraction of the probe signal and of the acceleration signal can be performed in the time domain, or else in a transformed domain such as, for example, in the frequency domain.

The subtraction of the probe signal and the acceleration signal can be performed particularly easily in the control and evaluation unit in the time domain by an analog subtracting amplifier that subtracts the analog probe signal of the probe sensor and the analog acceleration signal of the acceleration signal from one another. A subtracting amplifier is an operational amplifier which is connected via resistors such that the two signals at the inputs of the operational amplifier are subtracted from one another.

Alternatively, the subtraction of the probe signal and the acceleration signal in the control and evaluation unit can, of course, also be performed in the time domain, digitally, in particular by a microprocessor of the control and evaluation unit. This firstly requires the signals to be converted into digital signals via an analog/digital converter, the subtraction then being performed numerically in a microprocessor of the control and evaluation unit, or else in another suitable digital module.

The subtraction of the probe signal and the acceleration signal can, however, also take place in the frequency domain. To this end, the control and evaluation unit firstly subjects the probe signal and the acceleration signal to Fourier transformation, and then generates the evaluation signal by subtracting the Fourier transformed probe signal and the Fourier transformed acceleration signal.

In order to detect a contact, the evaluation signal determined by the subtraction can be compared in the control and evaluation unit with at least one predefined trigger condition. The most varied trigger conditions come into consideration here. The trigger conditions under which a contact is detected differ from one another here fundamentally as to whether the subtraction has been undertaken in the time domain or in the frequency domain. To the extent that the subtraction has been undertaken in the time domain, typical trigger conditions are the overshooting of a predefined trigger threshold, the duration in the course of which a trigger threshold must be overshot, or a two-stage trigger threshold, the higher trigger threshold needing to be performed at the latest within a predefined time period after the overshooting of the lower trigger threshold. To the extent that the subtraction has been undertaken in the frequency domain, the result of the subtraction is amplitudes in specific frequencies. One possible trigger condition could, for example, be that the amplitude of frequencies in a predetermined frequency band overshoots a predefined trigger threshold.

The control and evaluation unit can have a correction function that uses the profile of the evaluation signal to determine the actual contact time point, which is ahead of the time point at which the evaluation signal satisfies a predefined trigger condition, the control and evaluation unit using this contact time point to determine the scale values that represent the position of the probe head when making contact with the work piece.

The basis for such a correction function results from the following. In the case of a conventional valid contact process, the evaluation signal that was generated by subtraction of the probe signal from the acceleration signal overshoots a threshold set in the probe head logic at a time point that corresponds with adequate accuracy to the actual contact time point. However, there are cases in which at the contact time point an evaluation signal is generated which is so weak that the threshold set in the probe head logic is not overshot at the contact time point, but rather only later. The reasons for this could be disadvantageous contact directions, or long, thin probe pins, or contacts on soft material.

In such a case, it is sensible to apply a method with the aid of which the actual contact time point is determined as effectively as possible for the profile of the probe signal. By way of example, one approach is offered by the method described in our U.S. Pat. No. 5,425,180, in the case of which the profile of the probe signal is compared or correlated with a stored sample profile, the actual contact time point then being determined therefrom, and the scale values then being determined in accordance with this time point. Instead of the probe signal, it would be necessary in the case of the present invention to compare or correlate the evaluation signal with a stored sample profile, the actual contact time point then being determined therefrom. Reference is made hereby in full to U.S. Pat. No. 5,425,180.

Another method, which is even more suitable for correction, is the method described in our U.S. Pat. No. 5,862,604. In accordance with this method, the actual contact time point is derived from the probe signal by differentiating the probe signal with respect to time and using the first or higher derivatives of the probe signal to determine the accurate contact time point. The scale values x, y and z present at this time point are then accepted for farther processing. Instead of the probe signal, there will be a need in the case of the present invention to appropriately evaluate the evaluation signal. Reference is hereby made in full to the content of U.S. Pat. No. 5,862,604.

The correction function just described could be used permanently in the case of each measurement operation. However, it has emerged that the abovenamed corrections deliver virtually no improvement in the measurement results in the case of conventional measurements. It is therefore sensible to switch on said correction function only when the latter is actually required. In order to achieve this, it is possible for the probe unit to be deflectably supported on the probe head and a switch element is provided that outputs a switching signal upon deflection, and in which the control and evaluation unit switches on the correction function precisely when the time difference between the time point at which the evaluation signal satisfies a trigger condition and the time point at which the switching signal is output undershoots a predefined value. As a result of this, what are required are those measurements in the case of which the probe signal satisfies only at a very late stage individual trigger conditions such as the overshooting of a predefined threshold value.

The probe sensor can hereby be variously designed. For example, a piezocrystal can be involved here. Alternatively, it is also possible to provide strain gauges. The probe sensor can also consist of a plurality of individual sensors, for example of three piezosensors arranged offset, or three strain gauges so that contacts of the probe unit in different directions can be detected approximately equally well.

The acceleration sensor can also be variously designed. A piezoelectric sensor can be involved that has a piezoelectric measure value pickup and a mass body fastened thereon. However, it is also possible to use a strain gauge on which a mass body is fastened, or a magnetic sensor in the case of which a mass body suspended from a spring induces an electrical voltage by a magnet in a coil. Also known, for example, are miniaturized acceleration sensors, so-called microelectromechanical systems (MEMS) which are mostly produced from silicon. The sensors are spring-mass systems in the case of which the springs consist of silicon webs only a few m wide, and the mass body is also produced from silicon, it being possible to measure a change in the electrical capacitance by the deflection in the case of acceleration between the spring-suspended part and a fixed reference electrode.

In principle, the acceleration sensor can be of any desired design and be fastened at any desired location in the region of the probe head. However, the above described subtraction of the probe signal and the acceleration signal must thereby result in a suitable evaluation signal, the probe signal and the acceleration signal that occur upon an acceleration of the probe head must be relatively similar. This similarity can be produced by subjecting the acceleration signal to an analog or digital signal shaping. However, it is much simpler when the probe sensor and the acceleration sensor are configured such that they output virtually identical signals upon accelerations. One or more of the following measures can be undertaken in order to achieve this as well as possible.

The measurement pickup of the probe sensor and the measurement pickup of the acceleration sensor can be of the same kind. It can thereby foe ensured that forces of the same kind that act on the sensors lead to identical signals.

In addition, the mass of the mass body whose acceleration is determined by the measurement pickup of the acceleration sensor can correspond approximately to the mass of the probe unit. It is thereby achieved in addition that accelerations of the same kind on the probe unit and on the mass body lead to signals of the same kind.

Furthermore, the measurement pickup of the acceleration sensor and the measure value pickup of the probe sensor can have the same orientation. The acceleration sensor is to be fastened appropriately on the probe head for this purpose. For example, the acceleration sensor can be fastened for this purpose on that wall of the probe head opposite the probe unit. As a result, the probe sensor and the acceleration sensor output virtually identical signals upon accelerations of the probe head, since the probe unit and the mass body of the acceleration sensor are subjected to the same accelerations upon accelerations of the probe head. The signals are then phase shifted relative to one another in dependence upon the distance between the sensors.

In order also to foe able to eliminate a phase shift that may be present, the acceleration sensor can be arranged in the vicinity of the probe sensor. The acceleration sensor is to be fastened appropriately on the probe head for this purpose, as well. For example, the acceleration sensor can be fastened on a support that is, in turn, fastened inside the probe head housing such that the acceleration sensor is located in the vicinity of the probe sensor.

The control and evaluation unit within the meaning of this application hereby includes ail components for processing the signals of the read heads belonging to the scales, for processing the signals of the probe head, and for evaluating the measurement results. Insofar as a CNC-controlled coordinate measuring device is involved, the components that are necessary to produce a measurement cycle and to control the drives can also be present. Such a control and evaluation units can clearly be entirely different in design. For example, all the components of the control and evaluation unit can be accommodated in a single measurement computer. To the extent that special electrical components such as, for example, real-time-enabled microprocessors or analog electrical components are necessary, said components can be provided on separate cards that are installed in the measurement computer. Alternatively, individual electrical components of the control and evaluation unit can also be provided in the region of individual components of the coordinate measuring device, that is to say in the region of the probe head, for example. In the past, electrical components such as, for example, real-time-enabled microprocessors were frequently accommodated in a separate control cabinet. The individual components (measurement computer, controller and local components) intercommunicate by bus, for example.

The coordinate measuring device on which the inventive method is executed can be very variously configured. For example, it can be a portal-type measuring device, a bridge measuring device, a horizontal arm-type measuring device, or a measuring device with rotary joints, so that the mechanism via which the probe head is moved relative to the work piece is not significant. What is decisive is only that there is a mechanism present via which the probe head can be moved relative to the work piece. The mechanism can also be designed such that the work piece is moved and the probe head remains stationary. In this case, "scale values that represent the position of the probe head when making contact with the work piece" is understood to mean the measured scale values of the movable measuring support of the work piece.

It may be remarked for the sake of completeness that the determined scale values which define the position of the probe head when making contact with the work piece are used firstly to derive the measuring points of the work piece surface. This is usually done by calculating the scale values with the aid of the calibrated geometry of the probe unit (for example, the position of the probe ball midpoint in the machine coordinate system and the probe ball radius) and of the contact direction.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
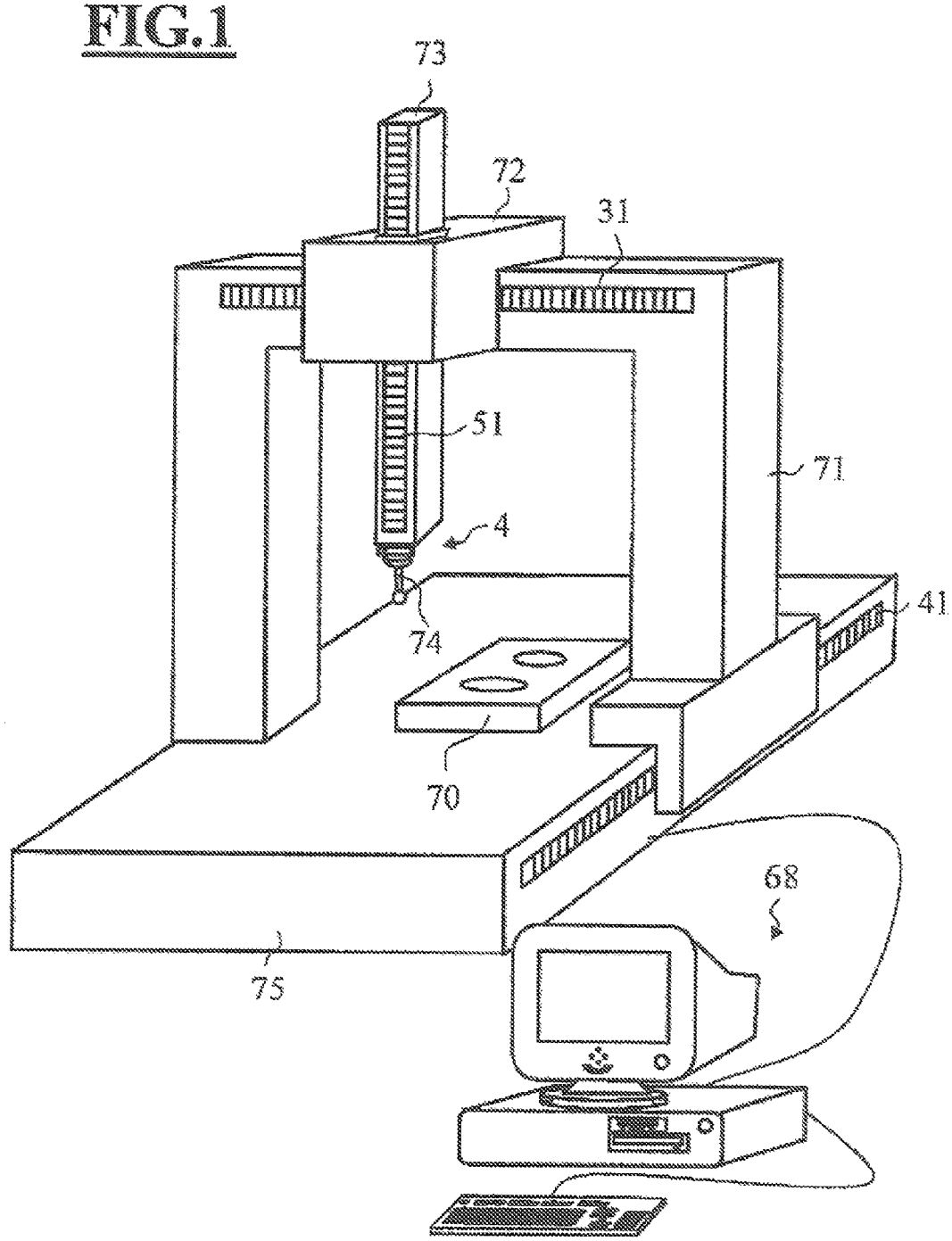
FIG. 1 shows by way of example a coordinate measuring device in which the inventive method is implemented.

FIG. 1 shows the design of a coordinate measuring device, purely by way of example. In order to measure a work piece 70 that is resting on a measuring table 75, a portal 71 is supported displaceably along the measuring table 75, it being possible to determine the position of the portal 71 in this measuring direction (denoted here as y-direction) via a scale 41 and an assigned d (not visible here). The portal 71 can be driven in this measuring direction via a drive (which is likewise not visible). An x-carriage 72 is displaceably supported, along the top side of the portal, it being possible to read the position of this measuring carriage 72 via a scale 31 and a read head (not visible). The x-carriage 72 is driven via a drive (not visible). Supported displaceably in a vertical direction (denoted here as z-direction), in turn, along this x-carriage is a quill 73 whose vertical position, can be determined via a scale 51 and an assigned read head, (likewise not visible here). The quill 73 is also driven via a drive that is not visible in more detail here. A probe head 4 with a probe unit 74 is fastened on the lower end of the quill 73, in the event of contact of the work piece 70 with the probe unit 74 contact being detected in the way described below and the scale values of the scales 31, 41 and 51 being determined thereby, said scales defining the position of the probe head 4, and being used to determine the exact position of the contacted measuring point on the work piece surface from the known geometry of the probe unit 74 and from the contact direction. The portal 71, the x-carriage 72 and the quill 73 thereby form the mechanism via which the probe head 4 can be moved relative to the work piece 70.

The coordinate measuring device farther has a control and evaluation unit 58 of which only a measuring computer is to be seen here. The purely exemplary control and evaluation unit 58 shown in FIG. 1 includes all the components which are required to produce a measuring cycle, to control the drives, to process the signals of the read heads belonging to the scales 31, 41 and 51, to process the signals of the probe head 4, and to evaluate the measurement results. As already explained in detail at the beginning, such a control and evaluation unit 68 can very well be of various designs. If the coordinate measuring device is, for example, a manual coordinate measuring device without drives, the control and evaluation unit 68 therefore includes neither components for providing a measuring cycle, nor components for controlling drives. The construction can also be entirely different. For example, it will be possible in principle for all electronic components of the control and evaluation unit 68 to be accommodated in a measuring computer, as shown in FIG. 1. To the extent that special electrical components such as, for example, real-time-enabled microprocessors or analog electrical components are required, these can be provided on cards that are installed m the measuring computer. As illustrated further below in conjunction with FIGS. 2 and 11, however, it is also possible in the region of the components of the coordinate measuring device, that is to say for example, in the region of the probe head 4, for this control and evaluation unit 68 to comprise electrical components such as analog electrical components (for example, amplifier, filter, analog/digital converter) or digital components such as microprocessors. Moreover, in the past whole modules such as, for example, real-time-enabled microprocessors were also frequently accommodated in a separate control cabinet, the individual components (measuring computer, controller and local components) intercommunicating.

Figure 2:
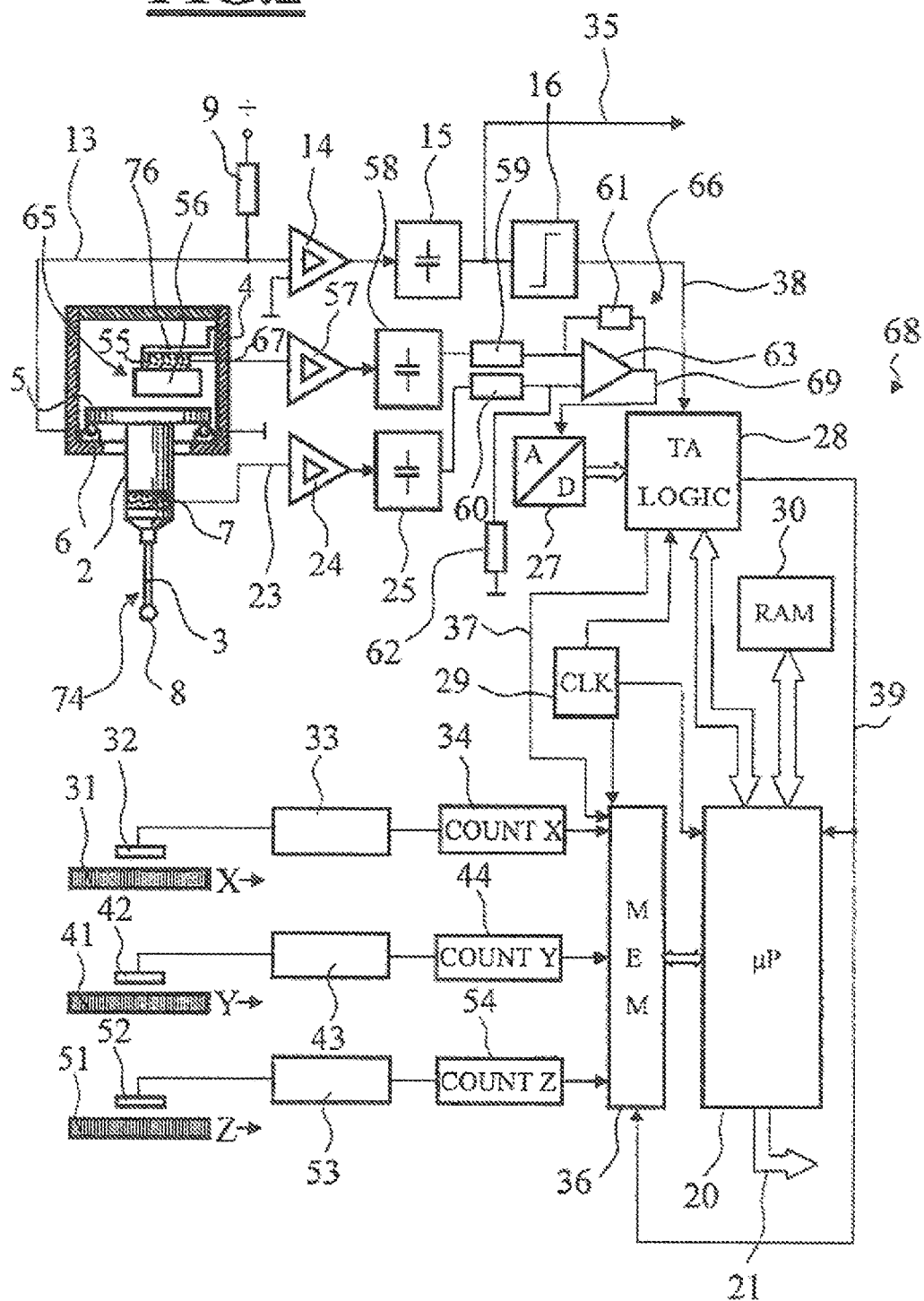
FIG. 2 shows a simplified block diagram that shows the essential components, required for signal processing in accordance with the inventive method, in accordance with an exemplary embodiment with an analog subtracting amplifier 66.

The probe head 4 of the switching type of the coordinate measuring device according to FIG. 1 is illustrated in simplified fashion in FIG. 2. As is to be seen, the probe unit 74 consisting of probe pin 3 and the probe ball 8 is fastened on a carrier 2 supported resiliently on balls 6. As to the bearing, three cylindrical bodies on the underside of the collar 5 on the carrier 2, which engage in three pairs of balls, respectively arranged offset by 120°, on that part of the probe head 4 fixed to the housing, form an electrical series circuit. During deflection of the probe unit 74 after contact of its probe ball 8 with the work piece, at least one of the three switches of the series circuit opens, an electrical switching signal thereby being generated. The signal line of this first switching signal is denoted by 13. This switching signal is also denoted as MECHK, for mechanical contact. The switching signal 13 passes to the probe head logic 28 via an amplifier stage 14 and a filter stage 15 as well as a pulse shaping stage 16.

Furthermore, within the carrier 2 for the probe unit 74 (probe pin 3 with its probe ball 8) the probe head 4 has a probe sensor 7 that is designed here as a piezoelectric sensor and, via a second signal line 23, transmits its probe signal to the input of a second preamplifier 24. The design, as piezoelectric sensor is, of course, entirely by way of example. As an alternative, other sensors could, of course, also be used. A strain gauge, for example, comes into consideration.

Connected downstream of the amplifier 24 is a highpass filter 25 that blocks the pure DC component of the probe signal 23. Instead of the highpass filter 25, it is also possible to use a bandpass. The probe signal 23 then passes, if a regular contact is present, virtually without change through an operational amplifier 63 that is connected by resistors 59, 60, 61 and 62 as subtracting amplifier. This subtracting amplifier subtracts the acceleration signal 67 of an acceleration sensor 65 from the probe signal 23 of the probe sensor 7. This is explained more thoroughly below in more detail. The signal emanating from the operational amplifier 63 connected as subtracting amplifier is led to an analog/digital converter 27 via the line 69. This signal is denoted below as evaluation signal 69 and explained in detail further below.

The output of the analog/digital converter 27 is connected to the probe head logic 28 and leads the digitized evaluation signal 69 to the probe head logic. The probe head logic 28 includes a processor for preprocessing of the evaluation signal 69, and a roiling memory, in which the time profile of the evaluation signal 69 over a suitable time period is stored, that is to say the time profile of the evaluation, signal 69 of a defined time period is available on demand by a microprocessor 20 in this memory.

As described above in conjunction with FIG. 1, the probe head 4 itself is fastened on the movable quill 73 of the coordinate measuring device. For the purpose of acquiring the measured length values in the three coordinate directions x, y and z, the three measuring carriages of the coordinate measuring device are assigned to the three scales 31, 41 and 51, which are scanned by the read heads 32, 42 and 52. The signal sequences, supplied by the read heads, of the incremental measuring systems are fed to counter modules 34, 44 and 54 after digital interpolation in three interpolators 33, 43 and 53. The counter outputs are connected to a second rolling memory unit 36 in which the time profile of the count is stored over a predefined time period. Both rolling memories, memory 36 and the rolling memory in the probe head logic 28, are synchronized with the microprocessor 20 via the clock generator 29 such that the exact temporal relationship between the profile of the evaluation signal 69 and the position of the probe head 4 is ensured.

During a contact process, the probe sensor 7 generates a probe signal 23 that reaches the subtracting amplifier 66 after passing through the highpass 25. As explained in further detail further below, the acceleration sensor 55 generates virtually no signal in the case of a regular contact, and so the evaluation signal 69 present at the output of the subtracting amplifier 66 corresponds virtually to the probe signal 23. This evaluation signal 59 is digitized by the analog/digital converter 27 and then overshoots a threshold set in the probe head logic 28. A signal NIM that is held over a predetermined time period is initiated in the probe head logic 28 by the overshooting of the set threshold. This takes place in the case of a regular contact at a time point that corresponds approximately to the actual contact time point at which the work piece 70 to be measured first makes contact with the probe ball 8, specifically when the signal intensity reaches the set threshold owing to the measuring force that builds up between ball 8 and work piece 70. At this time point, the rolling memory in the probe head logic 28, and also the rolling memory 36, are "frozen" via the signal line 37. The probe head logic 28 now awaits the switching signal 13 (MECHK) from the bearing points 6 of the probe head, which open somewhat later. When this signal MECHK arrives on the line 38, the probe head logic 28 "validates" the contact process and sends a corresponding signal pulse to a digital input of the microprocessor 20 via the signal line 39. To this extent, the circuit has the following as trigger conditions for initiating a contact:

the overshooting of a threshold by the evaluation signal,
the presence of the switching signal 13 (MECHK), and
the overshooting of the threshold by the evaluation signal, and the presence of the switching signal, take place within a predefined time period.

As soon as the probe head logic 28 has "validated" the contact process, and has sent a corresponding signal pulse to the digital input of the microprocessor 20 via the signal line 39, the evaluation signal 69, buffered in the memory of the probe head logic 28, and the time profiles, present in the memory 36, of the measured length values x, y and z are retrieved by the microprocessor 20 from the rolling buffers 28 and 36, and stored in a volatile memory 30. The further processing of the retrieved measured values is then performed in accordance with a sequence programmed in the firmware of the microprocessor 20. In this sequence, at that time point at which the evaluation signal 69 has overshot the threshold and, therefore, has generated the signal NIM, the measured values present at this time point have been determined from the memory 30 and output for further processing as measured values x, y and z.

In actual operation, it is possible in the case of the contact, just described, of a work piece 70, for example owing to accelerations such as for example, structureborne sound or airborne sound, for disturbances to arise that cause errors in the measuring sequence. For example, such disturbances can be caused by poor drives of the coordinate measuring device leading to rough running of the coordinate measuring device. This causes the probe unit 74 to vibrate such that the probe sensor 7 consequently has a defective probe signal 23. In the past, the result of this could have been for the predefined threshold in the probe head logic 23 to be overshot, by the resulting probe signal, thereby for the signal NIM to be generated in the probe head logic 28 over a predefined time period, and for the rolling memory in the probe head logic 28, as well as the rolling memory 36 to be "frozen" via the signal line 37. As long as no switching signal 13 (MECHK) results in response to such a defective NIM signal, this is unproblematic, because the contact is not validated. However, problems arise when the defective generation of the signal NIM is actually followed by a contact, and the switching signal 13 (MECHK) results within the expected time period from the opening bearing points 6 of the probe head 4. A contact is therefore assumed at a time point that occurs essentially earlier in part than the actual contact time point. This can lead to grave measuring errors.

In order to avoid such erroneous contacts, there is provided in that part of the probe head 4 fixed on the housing an acceleration sensor 65 chat consists, purely by way of example, of a mass body 56 and a piezoelectric measurement pickup 55. To the extent that, for example, the probe head 4 is excited to vibrations as a consequence of poor drives of the coordinate measuring device or of sound, the acceleration sensor 65 (mass body 56 and piezoelectric measurement pickup 55) generates an electrical acceleration signal 67 chat is switched via a preamplifier 57 and a highpass filter 58 to the second input of the subtracting amplifier 66 (operational amplifier 63, which is connected, as subtracting amplifier by resistors 59, 60, 61 and 62). The subtracting amplifier 66 (operational amplifier 63 and resistors 59, 60, 61 and 62) now subtracts the probe signal 23 of the probe sensor 7 from the acceleration signal 67 of the acceleration sensor 65, and passes the resulting evaluation signal 69, which has been produced by subtracting the probe signal 23 and the acceleration signal 67, on to the analog-digital converter 27, which digitizes the evaluation signal and passes it on to the probe head logic 28 for the evaluation already described.

Figure 3:
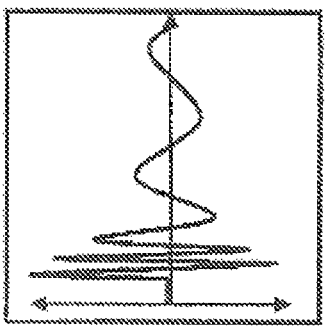
FIGS. 3-6 show the essential signals of signal processing in accordance with FIG. 2 given regular contact with a work piece.
Figure 4:
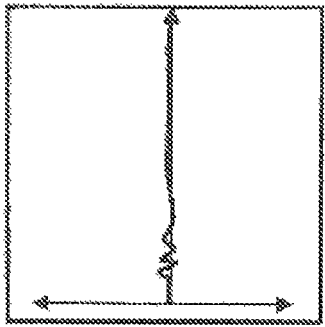
Figure 5:
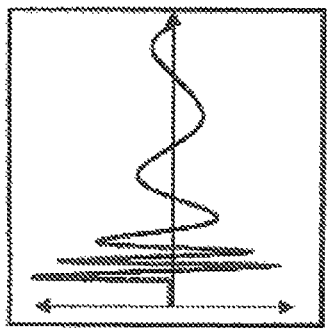
Figure 6:
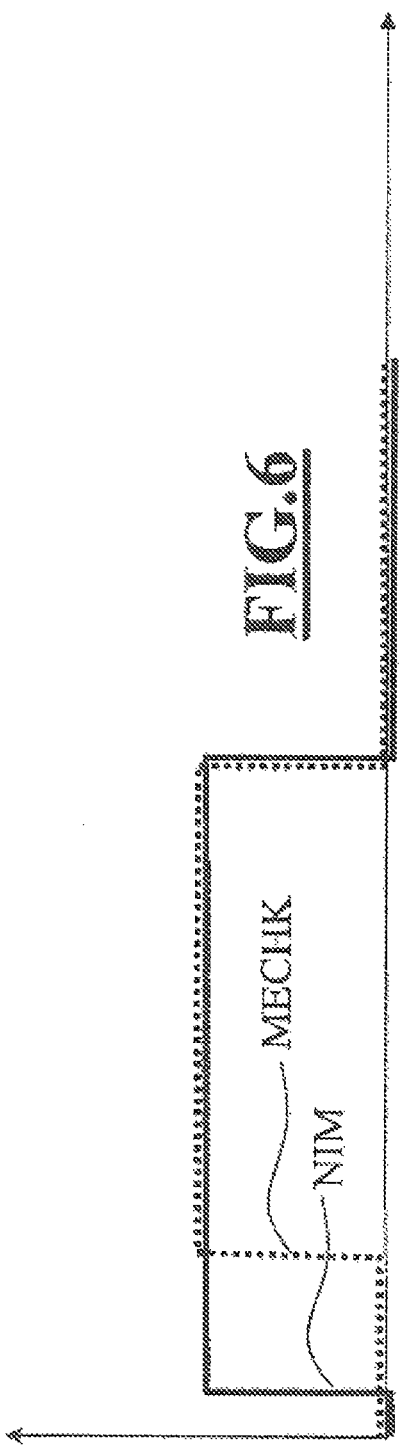

The attendant consequences are explained in more detail with the aid of FIGS. 3 to 6 for a valid contact. Thus, FIG. 3 shows the probe signal 23 of the probe sensor 7, and FIG. 4 the acceleration signal 67 of the acceleration sensor 65 given a regular contact of a work piece 70. As may be seen herefrom, owing to the contact the probe sensor 7 generates a signal of large amplitude, while the amplitude of the acceleration signal 67 is very small. During the subtraction of the probe signal 23 and the acceleration signal 67, the subtracting amplifier 66 generates the evaluation signal, to be seen in FIG. 5, which is denoted in FIG. 2 by the reference numeral 69. As is to be seen from FIG. 5, this evaluation signal 69 has a relatively large amplitude, said evaluation signal passing to the input of the analog/digital converter 27, which digitizes the evaluation signal 69 and passes it on to the probe head logic 28. The signal 69 thus generated and digitized overshoots the threshold set in the probe head logic 28 such that the signal HIM visible as a solid line in FIG. 6 is generated inside the probe head logic 28, the rolling memory in the probe head logic 28 and also the roiling memory 36 being "frozen" via the signal line 37 at this time point, as already stated above. The switching signal 13 (also denoted as MECHK) from the bearing points 6, opening somewhat later, of the probe head 4, on which the probe head logic 28 is now waiting, is drawn in FIG. 6 as a signal with a dashed line. Since the two signals are now present during an overlapping time period, the probe head logic 28 "validates" the contact process and sends a corresponding signal pulse via the signal line 39 to a digital input of the microprocessor 20, which further processes the signals, as described above. The trigger conditions "overshooting of the predefined threshold by the evaluation signal", "presence of the switching signal 13 (MECHK)" and "overshooting of the threshold by the evaluation signal and presence of the switching signal 13 (MECHK) in a predefined time period" are therefore satisfied hereby.

Figure 7:
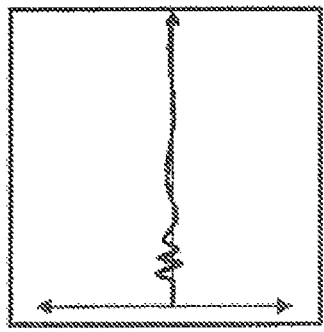
FIGS. 7-10 show the essential signals of signal processing in accordance with FIG. 2, given defective contact.

The case in which errors occur is illustrated in FIGS. 7 to 10, which show what happens if, for example, poor drives of the coordinate measuring device or sound excites the probe head 4 with the probe unit 74 fastened thereon to vibrations. Thus, FIG. 7 shows the probe signal 23 of the probe sensor 7 and FIG. 8 the corresponding acceleration signal 67 of the acceleration sensor 65 in the case of errors. As is to be seen herefrom, in the probe head logic 28 the probe signal 23 of the probe sensor 7 would overshoot the threshold that is required to initiate a contact, although there is actually no contact. This would then lead to an error when the work piece 70 actually experiences contact at a somewhat later time point and, as a result, the switching signal 13 (MECHK) arrives within the time period for which the signal NIM is held.

Figure 8:
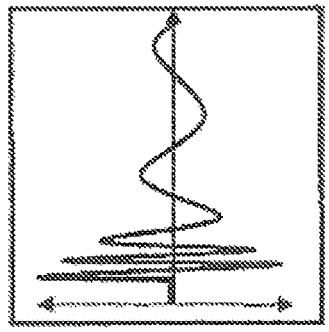
Figure 9:
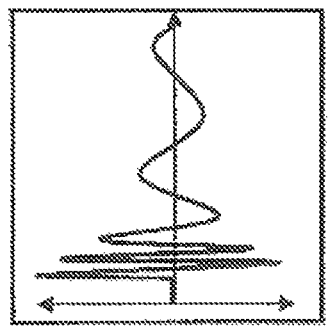
Figure 10:
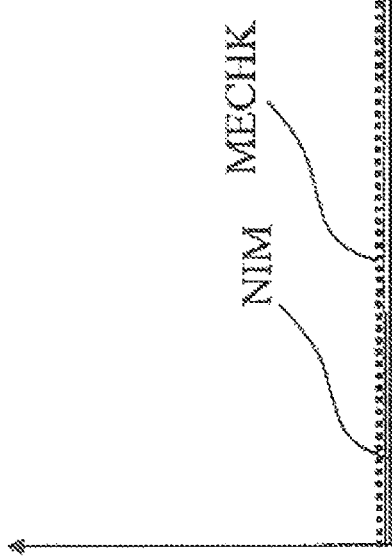

However, in the case of the inventive circuit in accordance with FIG. 2, by contrast, the acceleration sensor 65 also delivers an acceleration signal 67 of relatively large amplitude, as is to be seen from FIG. 8. During the subtraction of the two signals, the subtracting amplifier 66 therefore generates the evaluation signal 69 of very small amplitude to foe seen in FIG. 9, said signal passing to the input of the analog/digital converter 27, which digitizes the evaluation signal 69 and passes it on to the probe head logic 28. The evaluation signal 69 thus generated and digitized does not overshoot the threshold set in the probe head logic 28, and so a contact is not assumed and, consequently, the rolling memory in the probe head logic 28 and also the roiling memory 36 are not "frozen" via the signal line 37. Should a contact actually occur a few milliseconds later, it is possible hereby to generate valid measured values.

The following is to be noted with regard to the acceleration sensor 65. The latter is configured here such that the best possible results can be achieved in the present case. Firstly, the mass body 56 is dimensioned here such that its mass corresponds approximately to the mass of the probe unit 74. Moreover, two identical measurement pickups, specifically two identically designed piezoelectric crystals 7 and 55, were used in the case of the acceleration sensor 65 and of the probe sensor 7. The acceleration sensor 65 is thereby arranged such that accelerations of the mass body 56 lead to acceleration signals 67 of the acceleration sensor 65 chat are virtually identical to those probe signals 23 of the probe sensor 7 that result for identical accelerations of the probe unit 74. For this purpose, the measurement pickup 55 of the acceleration sensor 65 is arranged such that said pickup has the same orientation as the measurement pickup 7 of the probe sensor 7. Moreover, the acceleration sensor 65 is fastened in the vicinity of the probe sensor 7. This is implemented in the probe head 4 shown by fastening the acceleration sensor 65 on a support 76 that, in turn, is fastened on the probe head housing of the probe head 4.

Of course, the acceleration sensor 65 need not, however, be embodied as shown. Instead of the piezo-electrically operating acceleration sensor 65 shown here (piezoelectric measurement pickup 55 with mass body 56), it is possible by way of example to use any other desired acceleration sensor. For example, a strain gauge on which a mass body is fastened, or a magnetic sensor in the case of which, a mass body suspended from a spring induces an electrical voltage by a magnet in a coil. By way of example, there are also known miniaturized acceleration sensors, so-called microelectromechanical systems (MEMS) which are mostly produced from silicon. These sensors are spring-mass systems in the case of which the springs consist of silicon webs only a few m wide, and the mass body is also produced, from silicon, it being possible to measure a change in the electrical capacitance in the case of acceleration between the spring-suspended part and a fixed reference electrode. The acceleration sensor 65 can also be fastened on another location of the probe head 4. The mass of the mass body 56 also need not correspond to the mass of the probe unit 74. However, in the case of such modifications the signal of the acceleration sensor 65 must foe conditioned, for example by analog components such as, for example, appropriately connected operational, amplifiers, filters, or via digital signal processing in a microprocessor such that upon an acceleration of the mass body 56 and upon an acceleration of the probe unit 74 similar signals are produced by the acceleration sensor 65 and the probe sensor 7.

Figure 11:
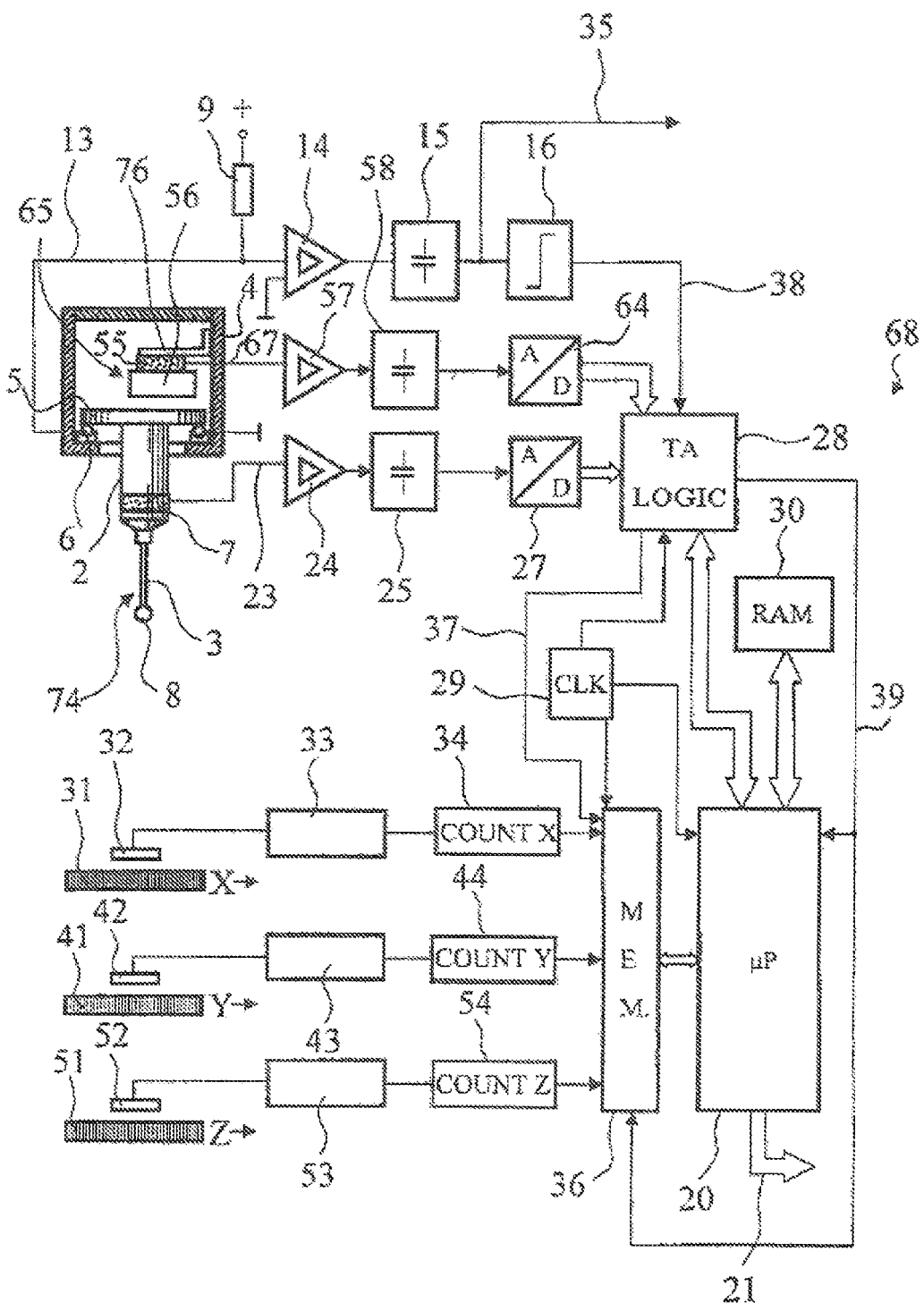
FIG. 11 shows a simplified block diagram that shows the essential components, required for signal processing of the probe signal according to the inventive method in accordance with a basic second exemplary embodiment, in the case of which the subtraction is performed digitally.

FIG. 11 shows a further simplified block diagram of another fundamental variant embodiment of signal processing corresponding to the inventive method. The design of this signal processing is relatively similar to the design of the signal processing according to FIG. 2, the corresponding components in FIG. 11 having been provided with the same reference numerals as those in FIG. 2. By contrast with FIG. 2, FIG. 11 has no subtracting amplifier 66 (operational amplifier 63, which is correspondingly connected by resistors 59, 60, 61 and 62). Instead of this, the signal 67 of the acceleration sensor 65 is connected here directly to a separate analog/digital converter 64 that digitizes the acceleration signal 67 of the acceleration sensor 55 and passes it on to the probe head logic 28. Moreover, the software is also of different configuration inside the probe head logic 28 and in the microprocessor 20, as is explained below.

In the case of a first operating mode of the signal processing according to FIG. 11, the circuit operates entirely similarly to the circuit according to FIG. 2, instead of the subtracting amplifier 66 from FIG. 2 the subtraction of the probe signal 23 from the probe sensor 7 and the acceleration signal 67 from the acceleration sensor 65 being undertaken digitally by a microprocessor inside the probe head logic 28 such that the method shown above in conjunction with FIGS. 3 to 6 and FIGS. 7 to 10 is carried out completely analogously in digital form. The sole difference is that the probe signal 23, shown in FIG. 3 or in FIG. 7, of the probe sensor 7, and the acceleration signal 67, shown in FIG. 4 and FIG. 8, of the acceleration sensor 65 is present in the form of discrete digitized values, and that the evaluation signal, shown in FIGS. 5 and 9, resulting from subtraction of these signals has been calculated, by a digital subtraction in the microprocessor of the probe head logic 28.

In the exemplary embodiments so far described in conjunction with the figures, the subtraction of the probe signal 23 and the acceleration signal 67 has been performed in the time domain. In a fundamental second operating mode of the signal processing according to FIG. 11, the subtraction of the probe signal 23 and the acceleration signal 67 is carried out in the frequency domain. For this purpose, both the probe signal 23 of the probe sensor 7, and the acceleration signal 67 of the acceleration sensor 65 are subjected to Fourier transformation by appropriate microprocessors inside the probe head logic 28. Only then is the subtraction of the Fourier transformed probe signal 23 and the Fourier transformed acceleration signal 67 performed, as is explained in more detail, below with the aid of FIGS. 12 and 17 for a valid contact.

Figure 13:
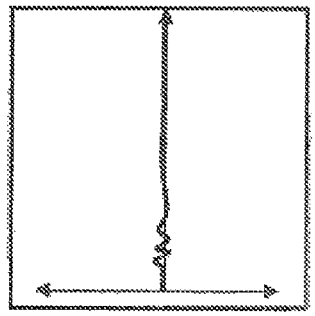
FIGS. 12-17 show the essential signals of signal processing in accordance with FIG. 11, given a regular contact with a work piece.
Figure 12:
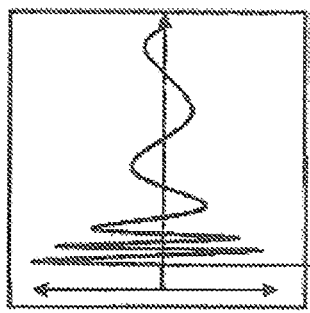
Figure 15:
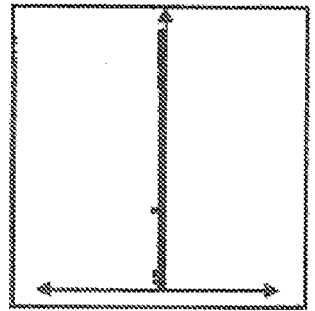
Figure 14:
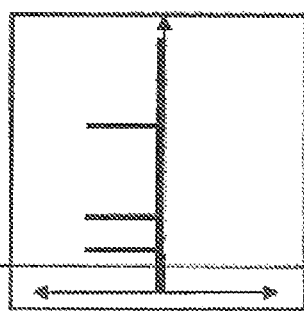
Figure 16:
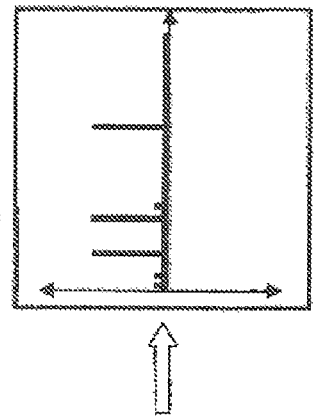
Figure 17:
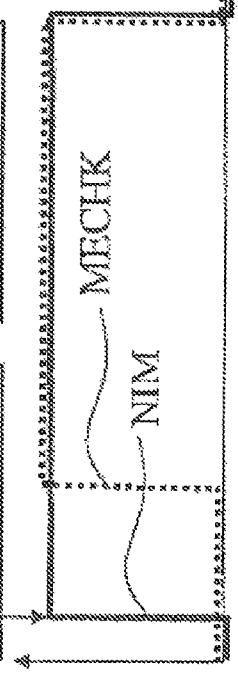
Figure 21:
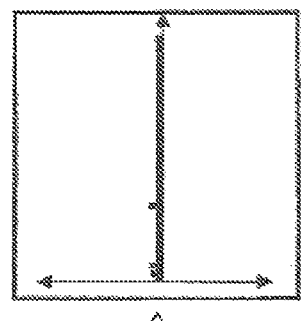
FIGS. 18-23 show the essential signals of signal processing in accordance with FIG. 11, given defective contact; and, FIGS. 24-27 show the essential signals of signal processing modified by comparison with FIG. 11, with a correction function.
Figure 19:
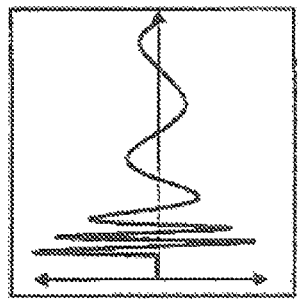

Thus, FIG. 12 shows the digitized probe signal 23 of the probe sensor 7, and FIG. 13 the corresponding digitized acceleration signal 67 of the acceleration sensor 65 in the case of a regular contact of the work piece 70. As is to be seen, the probe sensor 7 generates a probe signal 23 of large amplitude by the contact, while the amplitude of the acceleration signal 67 of the acceleration sensor 65 is very small. The digitized probe signal 23 of the probe sensor 7 is transformed try the microprocessor of the contact logic 28 into a Fourier transformed probe signal in accordance with FIG. 14. The digitized acceleration signal 67 of the acceleration sensor 65 is transformed by the microprocessor of the contact logic 28 into a Fourier transformed acceleration signal according to FIG. 15. The two signals are thereafter subtracted from one another, the result being the evaluation signal, to be seen in FIG. 16, of relatively large amplitudes at specific frequencies. The subtraction is performed in terms of frequency, that is to say the amplitude of a specific frequency in the Fourier transformed acceleration signal 67 is subtracted from the amplitude of a corresponding frequency in the Fourier transformed probe signal 23. A predefined trigger threshold is overshot because of these amplitudes of the evaluation signal shown in FIG. 16, and so the abovementioned signal NIM, which is illustrated in FIG. 17 by the solid line, is generated in the probe head logic 28. In order to check whether the evaluation signal overshoots a predefined trigger threshold, it is tested in the present case whether the amplitude of at least one frequency overshoots a predefined trigger threshold. Alternatively, however, it would also be possible for the amplitudes of a predefined frequency band to be checked selectively as to whether a predefined trigger threshold is overshot.

At this time point, at which the predefined trigger threshold is overshot by the evaluation signal, as already stated above the rolling memory in the probe head logic 28 and also the rolling memory 36 are "frozen" via the signal line 37. The switching signal 13 from the bearing points 6, opening somewhat later, of the probe head, which the probe head logic 28 now awaits, is drawn in FIG. 17 as a signal with dashed lines that has the designation "MECHK". Since both signals are now present during an overlapping time period, the probe head logic 28 "validates" the contact process and sends a corresponding signal pulse via the signal line 39 to a digital input of the microprocessor 20, which further processes the signals, as described above. The trigger conditions "overshooting of the predefined threshold by the evaluation signal", "presence of the switching signal 13 (MECHK)" and "overshooting of the threshold by the evaluation signal and presence of the switching signal 13 (MECHK) in a predefined time period" are therefore satisfied hereby.

Figure 18:
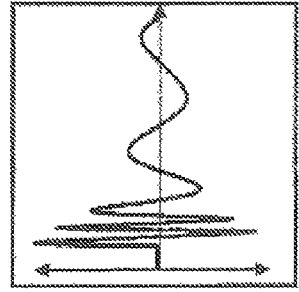

The result in the case of an erroneous contact is as illustrated in FIGS. 18 to 23. It is shown here what happens if disturbances, such as vibrations owing to poor drives of the coordinate measurement device or noise excite the probe head 4 with the probe unit 74 fastened thereon to vibrations. Thus, FIG. 18 shows the digitized probe signal 23 of the probe sensor 7, and FIG. 19 the corresponding digitized acceleration signal 67 of the acceleration sensor 65. As is to be seen herefrom, the probe sensor 7 generates a signal of large amplitude by said accelerations. However, this time the acceleration sensor 65 also generates a relatively large amplitude. The digitized signal 23 of the probe sensor 7 is transformed into a Fourier transformed probe signal according to FIG. 20 by the microprocessor of the contact logic 28. The digitized acceleration signal 67 of the acceleration sensor 65 is likewise transformed into a Fourier transformed acceleration signal according to FIG. 21 by the microprocessor of the contact logic 28. As is to be seen herefrom, the frequency spectra of the Fourier transformed probe signal (FIG. 20) and of the Fourier transformed acceleration signal (FIG. 21) are very similar, the reason being that the disturbing accelerations acting on the probe unit 74 and on the mass body 56 are identical and therefore cause very similar signals in the measurement pickup 7 of the probe sensor 7 and in the measurement pickup 55 of the acceleration sensor 65.

Figure 22:
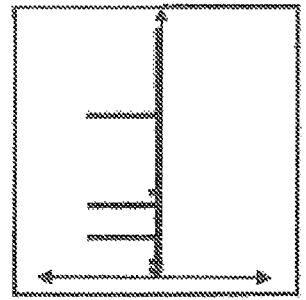
Figure 20:
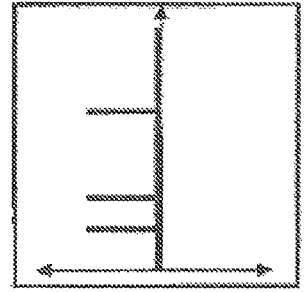
Figure 23:

Thereafter, the two Fourier transformed signals are subtracted from one another, the result being the signal of very small amplitudes to be seen in FIG. 22. Because of these small amplitudes, the predefined trigger threshold is not immediately overshot, and so the abovementioned signal NIM, which is represented in FIG. 23 by the solid line, does not occur in the probe head logic 28. Consequently, no contact is assumed, in the present case.

The exemplary embodiments described above in conjunction with FIG. 2 and FIG. 11 can still be developed as follows, as is to be seen with the aid of FIGS. 24 to 27. As already stated above, given a conventional valid contact process the evaluation signal that was generated by subtraction of the probe signal 23 from the probe sensor 7 with the acceleration signal 67 of the acceleration sensor 65 overshoots a threshold set in the probe head logic 28 at a time point that corresponds with adequate accuracy to the actual contact time point. However, there are also cases in which there is generated at the time point of the contact a probe signal so weak that the threshold set in the probe head logic is not overshot at the contact time point, but only later upon opening of the bearing points 6 of the probe head 4, when the switching signal 13 (MECHK) is output. The reasons for this can be disadvantageous contact directions or long, thin probe pins or contacts on soft material.

In such a case, it is sensible to apply the method described in our U.S. Pat. No. 5,863,604 in order to determine corrected measured values. Reference is hereby made in full to the content of U.S. Pat. No. 5,862,604. The following points may be noted at this juncture. In the US patent, the probe signal of the probe sensor (piezosensor) is evaluated in order to determine the particular contact time point therefrom. In contrast thereto, in connection with our invention it is, instead, the evaluation signal (in FIG. 2, the reference numeral 69, in FIG. 11 no reference numeral) that is appropriately evaluated. Moreover, a rectification of the probe signal to be evaluated is provided in the US patent. In contrast thereto, the evaluation signal (in FIG. 2, the reference numeral 69, in FIG. 11 no reference numeral) is not rectified. A rectification of the evaluation signal would be possible straight away in the present case, if it is desired. However, a rectification is in no way required to carry one the method described in the US patent and is therefore superfluous.

In the case of the application of the method, described from U.S. Pat. No. 5,862,604 in one of the circuits described in FIG. 2 or 11, there is provided in the microprocessor 20 a correction function that operates as follows. The correction function is implemented such that it is now not the time point at which the evaluation signal has overshot the threshold provided in the probe head logic 28 which is evaluated as contact trine point—rather the actual contact time point is derived from the evaluation signal itself by differentiating the evaluation signal with respect to time and using the first or higher derivatives of the evaluation signal to determine the accurate contact time point. The measured values present at this time point are then determined from the memory 30 and are output as scale values x, y and z for further processing.

Figures 24, 25, 26:
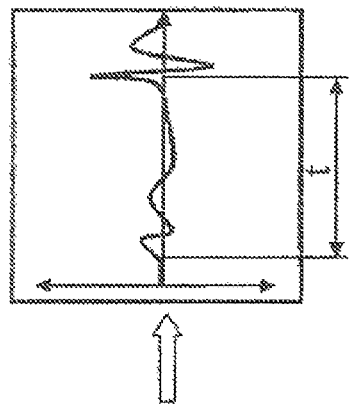
Figure 27:
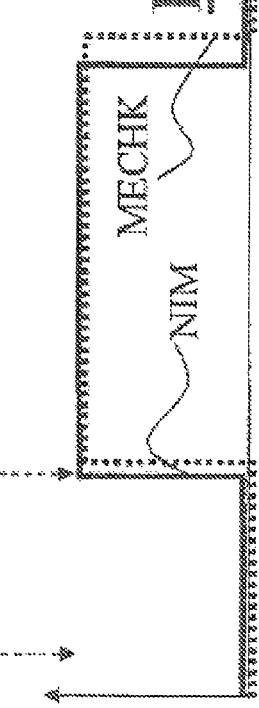

The correction function is switched on hereby, as explained in more detail below with the aid of FIGS. 24 to 27 for a valid contact. Thus, FIG. 24 shows the probe signal 23 of the probe sensor 7, and FIG. 25 the corresponding acceleration signal 67 of the acceleration sensor 65 in the case of a regular contact of the work piece 70. The evaluation signal to be seen in FIG. 26 results from the subtraction of the two signals. As is to be seen herefrom, this evaluation signal is of quite small amplitude at the beginning. This is the actual contact time point. However, at this instant the amplitude is so small that the threshold in the probe head logic 28 is not overshot. A larger amplitude is then present later. This amplitude occurs approximately at the time point of the opening of the bearing points 6 of the probe head 4, that is to say the time point at which the switching signal 13 (MECHK) occurs. At this time point, the evaluation signal overshoots the threshold set in the probe head logic 28, and so the signal NIM visible as a solid line in FIG. 27 is generated inside the probe head logic 28, the rolling memory in the probe head logic 28 and also the rolling memory 36 being "frozen" via the signal line 37 at this time point, as already stated above. The switching signal 13 (also denoted as MECHK) from the bearing points 6, opening somewhat later, of the probe head 4 which the probe head logic 28 is now awaiting, is drawn in FIG. 27 as a signal with a dashed line denoted by "MECHK". The probe head, logic 28 now determines that the temporal beginning of the signal NIM and the temporal beginning of the signal MECHK have undershot a predefined temporal spacing. The beginning of the signal "NIM" and the beginning of the signal "MECHK." are therefore very close to one another, and so the actual contact time point is consequently far ahead of the time point defined by the probe head logic 28 (the evaluation signal overshoots the threshold set in the probe head logic 28). Thereupon, the probe head logic 28 activates the above-described correction function. The latter then determines the time period t (see arrow provided with the reference times t in FIG. 26) from the evaluation signal, by which the actual contact time point lags with reference so the contact time point determined by the probe head, logic 28, and outputs the corresponding corrected scale values x, y and z.

It is understood that the foregoing description is that of the preferred embodiments of the invention and that various changes and modifications may be made thereto without departing from the spirit and scope of the invention as defined in the appended claims.

The invention claimed is:

1. A method for making coordinate measurements on a workpiece placed on a coordinate-measuring apparatus which includes a probe head having a probe unit and a probe sensor assigned to the probe unit, the probe sensor being configured to generate a probe signal when the probe unit touches the workpiece; and, based on the probe signal, measurement values (x, y, z) representing the position of said probe head when touching the workpiece are determined; the probe head further including an acceleration sensor configured to generate an acceleration signal when the probe head is accelerated; and, a control and evaluation unit; the method comprising the steps of:
    supplying said probe signal and said acceleration signal to said control and evaluation unit;
    with said control and evaluation unit, determining said measurement values (x, y, z) by determining an evaluation signal by subtracting said probe signal and said acceleration signal from each other; and then,
    based on said evaluation signal, determining said measurement values (x, y, z) which represent the position of said probe head when touching the workpiece.

2. The method of claim 1, wherein the subtraction of said probe signal and said acceleration signal takes place in said control and evaluation unit via an analog subtraction amplifier.

3. The method of claim 1, wherein the subtraction of said probe signal and said acceleration signal takes place in digital form in said control and evaluation unit.

4. The method of claim 3, wherein said subtraction takes place in a microprocessor of said control and evaluation unit.

5. The method of claim 1, wherein said control and evaluation unit first fourier transforms said probe signal and said acceleration signal and generates said evaluation signal by subtraction of said fourier transformed probe signal and said fourier transformed acceleration signal.

6. The method of claim 1, wherein said control and evaluation unit compares said evaluation signal to at least one predefined trigger condition to establish a contact.

7. The method of claim 1, wherein said control and evaluation unit provides a corrective function which determines the actual contact time point of the contact from the course of the evaluation signal, said time point lying ahead of the time point whereat said evaluation signal satisfies a predetermined trigger condition; and, said control and evaluation unit determines, based on the contact time sent, the measurement values (x, y, z) which represent the position of the probe head when the workpiece is contacted.

8. The method of claim 7, wherein the probe unit is journalled on said probe head so as to be deflectable; a switch element is provided which outputs a switch signal when said probe unit is deflected; and, said control and evaluation unit switches in said corrective function precisely when the time difference of the time point at which the evaluation signal satisfies a trigger condition and the time point at which the switch signal is outputted drops below a predetermined value.

9. The method of claim 1, wherein the measurement quantity receiver of the probe sensor and the measurement quantity receiver of said acceleration sensor are of the same kind.

10. The method of claim 1, wherein said acceleration sensor includes a mass body having an acceleration determined by the measurement quantity receiver of said acceleration sensor and the mass of said mass body corresponds approximately to the mass of said probe unit.

11. The method of claim 1, wherein the measurement quantity receiver of the acceleration sensor and the measurement quantity receiver of said probe sensor have the same orientation.

12. The method of claim 1, wherein the acceleration sensor is mounted in the vicinity of said probe sensor.

13. A coordinate-measuring apparatus for measuring a workpiece, the coordinate-measuring apparatus comprising:
    a probe head including a probe unit, a probe sensor and an acceleration sensor;
    said probe sensor being configured to generate a probe signal when said probe unit touches a workpiece;
    said acceleration sensor being configured to generate an acceleration signal in response to accelerations of said probe head;
    a mechanical assembly for moving said probe head relative to the workpiece;
    said mechanical assembly including measurement scales from which measurement values (x, y, z) can be determined representing the position of the probe head; and,
    a control and evaluation unit configured to determine those measurement values which represent the position of said probe head when touching the workpieces by subtracting said probe signal and said acceleration signal from each other to determine an evaluation signal and then, based on said evaluation signal, determining the measurement values which represent the position of the probe head when touching the workpiece.

14. The coordinate-measuring apparatus of claim 13, wherein said control and evaluation unit provides a corrective function which determines the actual contact time point of the contact from the course of the evaluation signal, said time point lying ahead of the time point whereat said evaluation signal satisfies a predetermined trigger condition; said control and evaluation unit determines, based on the contact time sent, the measurement values (x, y, z) which represent the position of the probe head when the workpiece is contacted; wherein said probe unit is mounted on said probe head so as to be deflectable; said probe head includes a switch for supplying a signal when said probe unit is deflected; and, said control and evaluation unit is configured to switch in said corrective function precisely when the time difference of the time point, whereat said evaluation signal satisfies a trigger condition, and the time point, whereat said switch signal is outputted, drops below a predetermined value.

15. The coordinate-measuring apparatus of claim 13, wherein the measurement quantity receiver of the probe sensor and the measurement quantity receiver of said acceleration sensor are of the same kind.

16. The coordinate-measuring apparatus of claim 13, wherein said acceleration sensor includes a mass body having an acceleration determined by the measurement quantity receiver of said acceleration sensor and the mass of said mass body corresponds approximately to the mass of said probe unit.

17. The coordinate-measuring apparatus of claim 13, wherein said acceleration sensor is attached to said probe head so as to cause said measurement quantity receiver of said acceleration sensor to have the same orientation as said measurement quantity receiver of said probe sensor.

18. The coordinate-measuring apparatus of claim 13, wherein said acceleration sensor is attached to said probe head so as to cause said acceleration sensor to be in the vicinity of said probe sensor.

19. The coordinate-measuring apparatus of claim 13, wherein the subtraction of said probe signal and said acceleration signal takes place in said control and evaluation unit via an analog subtraction amplifier.

20. The coordinate-measuring apparatus of claim 13, wherein the subtraction of said probe signal and said acceleration signal takes place in digital form in said control and evaluation unit.

21. The coordinate-measuring apparatus of claim 20, wherein said subtraction takes place in a microprocessor of said control and evaluation unit.

22. The coordinate-measuring apparatus of claim 13, wherein said control and evaluation unit first fourier transforms said probe signal and said acceleration signal and generates said evaluation signal by subtraction of said fourier transformed probe signal and said fourier transformed acceleration signal.

23. The coordinate-measuring apparatus of claim 13, wherein said control and evaluation unit compares said evaluation signal to at least one predefined trigger condition to establish a contact.

24. The coordinate-measuring apparatus of claim 13, wherein said control and evaluation unit provides a corrective function which determines the actual contact time point of the contact from the course of the evaluation signal, said time point lying ahead of the time point whereat said evaluation signal satisfies a predetermined trigger condition; and, said control and evaluation unit determines, based on the contact time sent, the measurement values (x, y, z) which represent the position of the probe head when the workpiece is contacted.

* * * * *

UNITED STATES PATENT AND TRADEMARK OFFICE
CERTIFICATE OF CORRECTION

| | | |
|---|---|---|
| PATENT NO. | : 9,046,335 B2 | Page 1 of 2 |
| APPLICATION NO. | : 13/658714 | |
| DATED | : June 2, 2015 | |
| INVENTOR(S) | : A. Fuchs et al. | |

It is certified that error appears in the above-identified patent and that said Letters Patent is hereby corrected as shown below:

On the Title Page:
Under (57) Abstract: delete "workplaces" and substitute -- workpieces -- therefor in the first line.

In the Specification:
In Column 1:
Line 18: delete "treasuring" and substitute -- measuring -- therefor.

In Column 4:
Line 25: delete "farther" and substitute -- further -- therefor.

In Column 5:
Line 18: delete "foe" and substitute -- be -- therefor.
Line 39: delete "foe" and substitute -- be -- therefor.
Line 48: delete "ail" and substitute -- all -- therefor.

In Column 7:
Line 1: delete "d" and substitute -- read head -- therefor.
Line 3: delete "supported," and substitute -- supported -- therefor.
Line 23: delete "farther" and substitute -- further -- therefor.
Line 24: delete "58" and substitute -- 68 -- therefor.
Line 26: delete "58" and substitute -- 68 -- therefor.
Line 43: delete "m" and substitute -- in -- therefor.

In Column 8:
Line 33: delete "roiling" and substitute -- rolling -- therefor.
Line 35: delete "evaluation," and substitute -- evaluation -- therefor.
Line 59: delete "55" and substitute -- 65 -- therefor.
Line 63: delete "59" and substitute -- 69 -- therefor.

Signed and Sealed this
Twenty-second Day of December, 2015

Michelle K. Lee
*Director of the United States Patent and Trademark Office*

CERTIFICATE OF CORRECTION (continued)
U.S. Pat. No. 9,046,335 B2

In Column 9:
Line 50: delete "23" and substitute -- 28 -- therefor.
Line 50: delete "overshot," and substitute -- overshot -- therefor.
Line 67: delete "chat" and substitute -- that -- therefor.

In Column 10:
Line 7: delete "chat" and substitute -- that -- therefor.
Line 10: delete "connected," and substitute -- connected -- therefor.
Line 37: delete "HIM" and substitute -- NIM -- therefor.
Line 40: delete "roiling" and substitute -- rolling -- therefor.

In Column 11:
Line 8: delete "foe" and substitute -- be -- therefor.
Line 15: delete "roiling" and substitute -- rolling -- therefor.
Line 29: delete "chat" and substitute -- that -- therefor.
Line 61: delete "foe" and substitute -- be -- therefor.
Line 63: delete "tional," and substitute -- tional -- therefor.

In Column 12:
Line 13: delete "55" and substitute -- 65 -- therefor.
Line 31: delete "calculated," and substitute -- calculated -- therefor.
Line 55: delete "try" and substitute -- by -- therefor.

In Column 14:
Line 14: delete "5,863,604" and substitute -- 5,862,604 -- therefor.
Line 29: delete "one" and substitute -- out -- therefor.
Line 31: delete "method," and substitute -- method -- therefor.
Line 38: delete "trine" and substitute -- time -- therefor.

In Column 15:
Line 2: delete "head," and substitute -- head -- therefor.
Line 6: delete "MECHK." and substitute -- MECHK -- therefor.
Line 16: delete "head," and substitute -- head -- therefor.